United States Patent
Baughman et al.

(10) Patent No.: US 11,494,996 B2
(45) Date of Patent: Nov. 8, 2022

(54) DYNAMIC INTERACTION DEPLOYMENT WITHIN TANGIBLE MIXED REALITY

(71) Applicant: INTERNATIONAL BUSINESS MACHINES CORPORATION, Armonk, NY (US)

(72) Inventors: Aaron K. Baughman, Cary, NC (US); Shikhar Kwatra, San Jose, CA (US); Pritesh Patel, Raleigh, NC (US); Vijay Ekambaram, Chennai (IN); Prasenjit Dey, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 2 days.

(21) Appl. No.: 17/106,260

(22) Filed: Nov. 30, 2020

(65) Prior Publication Data

US 2022/0172436 A1 Jun. 2, 2022

(51) Int. Cl.
*G06T 19/00* (2011.01)
*G06T 13/20* (2011.01)
(Continued)

(52) U.S. Cl.
CPC ........ *G06T 19/006* (2013.01); *G02B 27/0172* (2013.01); *G06F 3/016* (2013.01);
(Continued)

(58) Field of Classification Search
CPC ... G06T 19/006; G06T 13/20; G02B 27/0172; G02B 2027/0178; G06F 3/016;
(Continued)

(56) References Cited

U.S. PATENT DOCUMENTS

| 9,361,730 B2 | 6/2016 | Keating | |
|---|---|---|---|
| 2010/0106536 A1* | 4/2010 | Yildiz | G06Q 10/063 706/46 |

(Continued)

FOREIGN PATENT DOCUMENTS

| CN | 103366610 B | 7/2015 |
|---|---|---|
| CN | 109828666 A | 5/2019 |

(Continued)

OTHER PUBLICATIONS

Billinghurst et al., "Tangible augmented reality", 2008, https://www.semanticscholar.org/paper/Tangible-augmented-reality-Billi . . . , Semantic Scholar, pp. 1-14.

(Continued)

*Primary Examiner* — Maurice L. Mcdowell, Jr.
(74) *Attorney, Agent, or Firm* — Kristofer L. Haggerty

(57) ABSTRACT

A method, a structure, and a computer system for tangible mixed reality. Exemplary embodiments may include identifying one or more real objects within an environment and identifying one or more interactions between the one or more real objects, one or more reactive objects, and one or more animations therebetween. The exemplary embodiments may further include generating one or more learning activities for a user of a mixed reality headset that include at least one of the one or more interactions, and deploying the one or more learning activities to the mixed reality headset.

17 Claims, 6 Drawing Sheets

(51) Int. Cl.
*G06N 5/02* (2006.01)
*G06F 3/01* (2006.01)
*G02B 27/01* (2006.01)
*G06N 20/00* (2019.01)

(52) U.S. Cl.
CPC .............. *G06N 5/02* (2013.01); *G06N 20/00* (2019.01); *G06T 13/20* (2013.01); *G02B 2027/0178* (2013.01)

(58) Field of Classification Search
CPC .......... G06F 3/011; G06N 5/02; G06N 20/00; G09B 19/00
See application file for complete search history.

(56) References Cited

U.S. PATENT DOCUMENTS

| | | | | |
|---|---|---|---|---|
| 2011/0022436 | A1* | 1/2011 | Swaminathan | G06Q 10/06 705/7.13 |
| 2013/0314341 | A1* | 11/2013 | Lee | G06F 3/0481 345/173 |
| 2013/0324241 | A1 | 12/2013 | Elliott | |
| 2014/0028713 | A1 | 1/2014 | Keating | |
| 2016/0049095 | A1 | 2/2016 | Yannier | |
| 2017/0154111 | A1* | 6/2017 | de Bayser | H04L 67/22 |
| 2018/0308377 | A1* | 10/2018 | Pena-Rios | G09B 5/12 |
| 2019/0228269 | A1* | 7/2019 | Brent | G06F 8/34 |
| 2019/0340817 | A1* | 11/2019 | Bostick | G06F 3/04815 |
| 2019/0371071 | A1 | 12/2019 | Lyons | |
| 2020/0342668 | A1* | 10/2020 | Chojnacka | G06T 19/006 |
| 2021/0073429 | A1* | 3/2021 | Blechschmidt | G06F 30/10 |
| 2021/0192972 | A1* | 6/2021 | Acharya | G06V 20/20 |
| 2021/0350776 | A1* | 11/2021 | O'Brien | B25J 11/0035 |
| 2022/0066550 | A1* | 3/2022 | Govindgari | G06V 40/20 |

FOREIGN PATENT DOCUMENTS

| | | | | |
|---|---|---|---|---|
| CN | 110309570 A | * | 10/2019 | ......... G06F 17/2775 |
| EP | 3598341 A1 | * | 1/2020 | ............ G06F 21/32 |
| WO | WO-2021041755 A1 | * | 3/2021 | ......... G06K 9/00664 |

OTHER PUBLICATIONS

Marco et al., "Evaluating a Tangible Game Video Console for Kids," Gross et al. (Eds): INTERACT 2009, Part I, LNCS 5726, https://link.springer.com/content/pdf/10.1007%2F978-3-642-03655-2_17.pdf, 2009, pp. 141-144.

Mell et al., "The NIST Definition of Cloud Computing", National Institute of Standards and Technology, Special Publication 800-145, Sep. 2011, pp. 1-7.

Muñoz, "Supporting Technology for Augmented Reality Game-Based Learning," Doctoral Thesis, University of Sirona, Catalonia, Spain, http://hdl.handle.net/10803/132xxx, 2017, pp. 1-218, split into 3 parts.

* cited by examiner

DYNAMIC INTERACTION DEPLOYMENT WITHIN TANGIBLE MIXED REALITY

BACKGROUND

The exemplary embodiments relate generally to mixed reality, and more particularly to dynamic interaction deployment within tangible mixed reality.

Mixed reality is the merging of real and virtual worlds to produce new environments and visualizations where physical and digital objects co-exist and interact in real time. With the emergence of mixed reality, as well as the integration of haptic devices, opportunities have emerged to use such technology for purposes that include education, healthcare, design, and gaming.

SUMMARY

The exemplary embodiments disclose a method, a structure, and a computer system for tangible mixed reality. Exemplary embodiments may include identifying one or more real objects within an environment and identifying one or more interactions between the one or more real objects, one or more reactive objects, and one or more animations therebetween. The exemplary embodiments may further include generating one or more learning activities for a user of a mixed reality headset that include at least one of the one or more interactions, and deploying the one or more learning activities to the mixed reality headset.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

Mixed reality is the merging of real and virtual worlds to produce new environments and visualizations where physical and digital objects co-exist and interact in real time. With the emergence of mixed reality, as well as the integration of haptic devices, opportunities have emerged to use such technology for purposes that include education, healthcare, design, and gaming.

Figure 1:
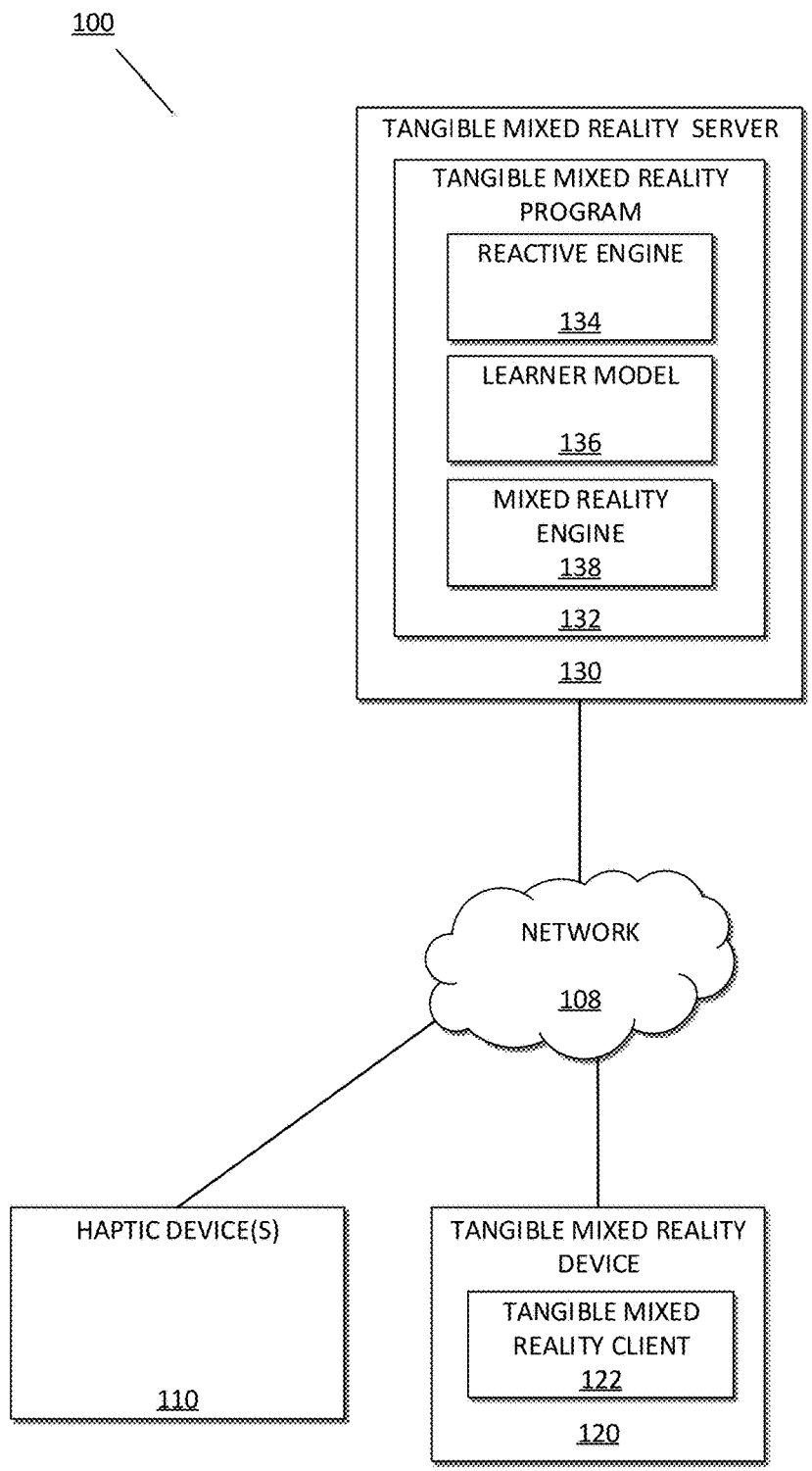
FIG. 1 depicts an exemplary schematic diagram of a tangible mixed reality system 100, in accordance with the exemplary embodiments.

FIG. 1 depicts the tangible mixed reality (MR) system 100, in accordance with exemplary embodiments. According to the exemplary embodiments, the tangible MR system 100 may include one or more haptic devices 110, a tangible mixed reality (MR) device 120, and a tangible mixed reality (MR) server 130, which all may be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc., which may be implemented as an intranet network, a local area network (LAN), a wide area network (WAN), or a combination thereof. In further embodiments, the network 108 may be a Bluetooth network, a Wi-Fi network, or a combination thereof. The network 108 may operate in frequencies including 2.4 GHz and 5 GHz Internet, near-field communication, Z-Wave, Zigbee, etc. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices.

In exemplary embodiments, the haptic devices 110 may be one or more mechanical devices that apply forces, vibrations, motions, etc., such that a wearer feels a sense of touch. Accordingly, the haptic devices 110 may be configured to be worn on the arms, hands, feet, legs, head, etc. of a user of the tangible MR device 120. Moreover, the haptic devices 110 may include one or more sensors capable of collecting data about a wearer, such as activity data and biometric data. The haptic devices 110 may be further connected to one or more computing devices, for example the mixed reality device 120 and the tangible mixed reality server 130, via the network 108, and the sense of touch may be correlated with one or more digital or physical objects, actions, and interactions viewed by a user through the mixed reality device 120.

In exemplary embodiments, the tangible mixed reality (MR) device 120 includes a tangible mixed reality (MR) client 122, and may be a device such as glasses, goggles, a visor/screen, a headset, or any other visual display device capable of overlaying a virtual image, actions, and/or interactions over a real world view of a user via a display, hologram, etc. In embodiments, the tangible MR device 120 may further include a computing device and components thereof, for example those depicted by FIG. 4, as well as other components such as a microphone, speaker, touchscreen, controller, gyroscope, accelerometer, global positioning system (GPS), transceiver, etc. In some embodiments, rather than directly incorporating the aforementioned components, the tangible MR device 120 may be capable of integration with a smart device already having such components, e.g., a smart phone, tablet, computing device, etc. The tangible MR device 120 is described in greater detail as a hardware implementation with reference to FIG. 4, as part of a cloud implementation with reference to FIG. 5, and/or as utilizing functional abstraction layers for processing with reference to FIG. 6.

In exemplary embodiments, the tangible mixed reality client 122 may act as a client in a client-server relationship with a server, for example the tangible MR server 130, and may be a software and/or hardware application capable of communicating with and providing a user interface for a user to interact with a server and other computing devices via the network 108. Moreover, in the example embodiment, the tangible MR client 122 may be capable of transferring data between the tangible MR device 120 and other devices via the network 108. In embodiments, the tangible MR client 122 may utilize various wired and wireless connection protocols for data transmission and exchange, including Bluetooth, 2.4 GHz and 5 GHz internet, near-field communication, Z-Wave, Zigbee, etc. The tangible MR client 122 is described in greater detail with respect to FIG. 2-6.

In exemplary embodiments, the tangible MR server 130 includes a tangible mixed reality (MR) program 132, and may act as a server in a client-server relationship with the tangible MR client 122. The tangible MR server 130 may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of sending and receiving data to and from other computing devices. While the tangible MR server 130 is shown as a single device, in other embodiments, the tangible MR server 130 may be comprised of a cluster or plurality of computing devices, in a modular manner, etc., working together or working independently. The tangible MR server 130 is described in greater detail as a hardware implementation with reference to FIG. 4, as part of a cloud implementation with reference to FIG. 5, and/or as utilizing functional abstraction layers for processing with reference to FIG. 6.

In embodiments, the tangible MR program 132 may include a reactive engine 134, a learner model 136, and a mixed reality engine 138, and may be a software and/or hardware program capable of recognizing objects within a surrounding environment. The tangible MR program 132 may be further capable of generating a knowledge graph of the one or more objects and generating a learner model corresponding to a user of the tangible MR device 120. Moreover, the tangible MR program 132 may be capable of creating a mixed reality learning activity based on the surrounding environment and learner model. Lastly, the tangible MR program 132 may be capable of determining whether a user correctly completes the learning activity and, based thereon, displaying a corresponding animated MR reaction and adjusting models. The tangible MR program 132 is described in greater detail with reference to FIG. 2-6.

The reactive engine 134 may be a software and/or hardware program capable of generating an knowledge graph that maps one or more relationships between one or more objects, one or more reactive objects, and one or more mixed reality (MR) animations therebetween. The reactive engine 134 is described in greater detail with reference to FIG. 2-6.

The learner model 136 may be a software and/or hardware program capable of modelling a user's knowledge, misconceptions, difficulties, strengths/weakness, vocabulary, etc. In embodiments, the learner model may include various topics, e.g., mathematics, physics, history, grammar, etc., as well as a level of mastery thereof. The mastery may be measured by metrics such as scores/grades, course/concept completion (absolute/percentage), quiz/test results, etc. In addition to representing a user's knowledge and extent thereof, the learner model may further be used to determine what else the user should know and how the user can learn it. In embodiments, the tangible MR program 132 may generate the learner model by first extracting or receiving as input one or more user features, which may include age, average rank, scores in various subjects, vocabulary, reading comprehension, writing comprehension, and other metrics that may be used to quantify the learning of a user. In exemplary embodiments, the learner model 136 may utilize regression models, e.g., Random Forest, in order to train one or more algorithms that correlate the extracted user features with a learning level. The models may be trained using previous data, known as training data, wherein the learner model 136 trains an algorithm that outputs a known outcome of the training data based on the known inputs of the training data. Once trained, the algorithm may then be applied to new inputs in order to predict unknown outputs in a process known as predictive modelling. In embodiments, the output of the model may be a learner model corresponding to the user, overall and/or with respect to particular subjects/topics/subtopics. The learner model 136 is described in greater detail with reference to FIG. 2-6.

The MR engine 138 may be a software and/or hardware program capable of generating and deploying an MR animation corresponding to a correctly (or incorrectly) completed learning activity. The MR engine 138 is described in greater detail with reference to FIG. 2-6.

Figure 2:
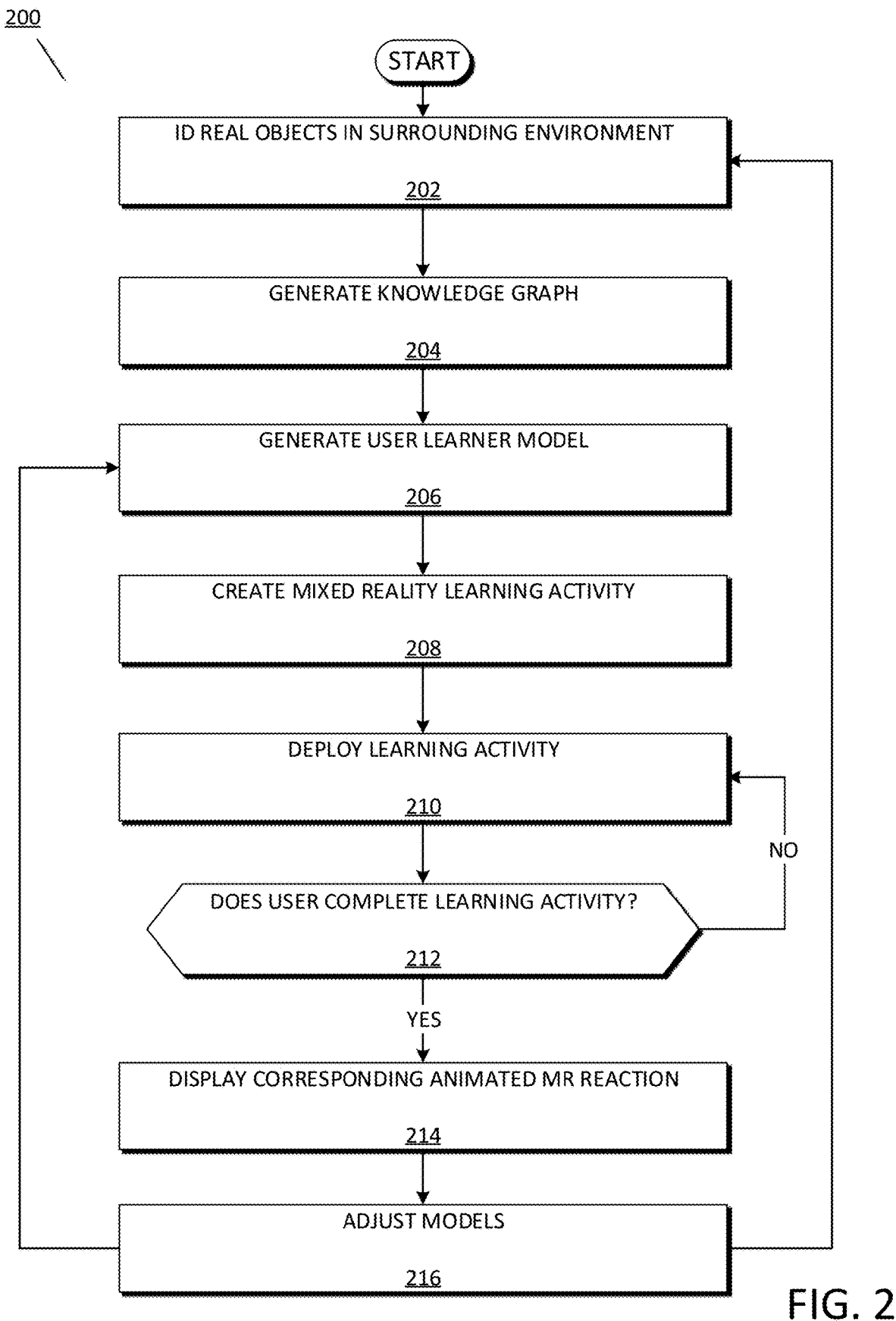
FIG. 2 depicts an exemplary flowchart 200 illustrating the operations of a tangible mixed reality program 132 of the tangible mixed reality system 100, in accordance with the exemplary embodiments.

FIG. 2 depicts an exemplary flowchart 200 illustrating the operations of the tangible MR program 132 of the tangible MR system 100, in accordance with the exemplary embodiments.

The tangible MR program 132 may detect and identify real objects within a surrounding environment (step 202). In embodiments, the tangible MR program 132 may detect real objects within an environment using integrated cameras and sensors in conjunction with visual recognition techniques. Such techniques may analyse images and video in order to identify scenes, objects, people, and other content using classification techniques. In addition, the tangible MR program 132 may identify real objects using other techniques such as user input and network connections. More specifically, the tangible MR program 132 may receive user input identifying objects via the tangible MR client 122 and the network 108 or, alternatively, scan networks such as Wi-Fi networks, Internet of Things (IoT) networks, near-field and radio frequencies (e.g., RFID tags), etc. In embodiments, the tangible MR program 132 may be configured to identify and record all real world objects within a view and/or environment of the tangible MR device 120, as well as those detected via the network 108 and other real object detection techniques.

In order to better illustrate the operations of the tangible MR program 132, reference is now made to an illustrative example wherein a user wears the tangible MR device 120 within a room. Here, the tangible MR program 132 identifies a nearby television and electric bulb via a network connection, and additionally recognizes a pile of wood and a white board via visual recognition.

Figure 3:
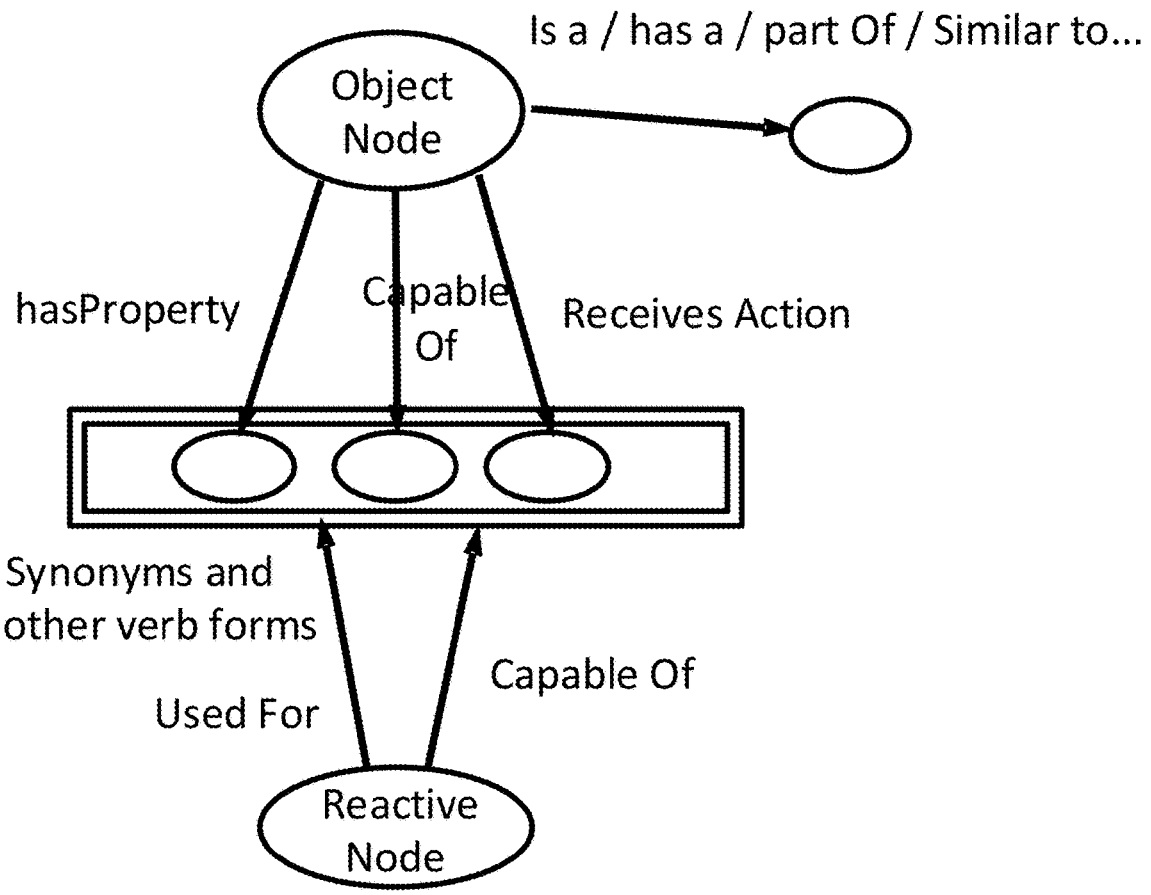
FIG. 3 depicts an example illustrating the operations of the tangible mixed reality program 132 of the tangible mixed reality system 100, in accordance with the exemplary embodiments.

The tangible MR program 132 may identify and map labels related to the real objects by generating a knowledge graph (step 204). In embodiments, the tangible MR program 132 may identify and map relationships by generating one or more knowledge graphs of the recognized real objects, and do so using the reactive engine 134. Knowledge graphs relate objects using relationships such as synonyms, antonyms, type of, types, parts, parts of, similar, etc. Examples of relationships defined by an object graph are depicted by FIG. 3 wherein the node of a real object (illustrated as "Object Node") is related to a "Reactive Node" of a reactive object based on relationships such as "HasProperty", "CapableOf", "ReceivesAction", and "UsedFor". Using a knowledge graph, the tangible MR program 132 is capable of identifying one or more reactive objects corresponding to the real objects recognized in the surrounding environment. Similarly, using the knowledge graph, the tangible MR program 132 is capable of identifying an animation corresponding to an interaction between the real objects and the reactive objects. In embodiments, the tangible MR program 132 may utilize the knowledge graph to map any number of objects, reactive objects, and corresponding animations, hereinafter each collectively referred to interactions, then select a most appropriate one or more of the interactions for a learning activity based on the specific user, described in greater detail forthcoming.

Returning to the illustrative example introduced above, the tangible MR program 132 identifies and maps labels related to each of the television, wood, electric bulb, and white board within the room to identify the interactions as illustrated by Table 1:

TABLE 1

| Interaction Mapping | | |
|---|---|---|
| Object Node | Reactive Node | AR Animation |
| TV | Remote | TV Playing Content |
| Wood | Fire | Wood Burning |
| Electric Bulb | Electrical Connection | Bulb Glows |
| White Board | Marker | Writing Test |

The tangible MR program 132 may generate a learner model for a user of the tangible MR device 120 (step 208). In embodiments, the tangible MR program 132 may generate the learner model via the learner model 136, and the learner model may correlate user features with a degree of knowledge of one or more subjects. Such features may include age, average rank/grade, scores in various subjects, vocabulary, etc., and application of the learner model to the features may output a degree of knowledge both generally and in one or more subjects. In embodiments, the learner model may be trained using training data having known inputs and outputs using regression techniques, e.g., Random Forest. The trained model may then be applied to new inputs in order to output the degree of knowledge. In embodiments, the tangible MR program 132 may determine a degree of knowledge of a user of the tangible MR device 120 such that the generated learning activities target subjects needing the most user improvement. Moreover, by taking into account other users, the tangible MR program 132 may be capable of determining a user's mastery of the various subjects given their age, grade, etc., as well as determine what topic the user should learn next and how to learn it. In embodiments, the generated learner model may be utilized to select one or more appropriate learning activities for the user, described in greater detail forthcoming.

Furthering the previously introduced example, the tangible MR program 132 generates a learner model corresponding to the user of the tangible MR device 120 that describes a proficiency of the user generally and across various subjects, as well as a known vocabulary.

The tangible MR program 132 may create one or more mixed reality learning activities based on the learner model and one or more interactions (step 210). In embodiments, the tangible MR program 132 may generate one or more learning activities that involve the user of the tangible MR device 120 manipulating at least one of a real object and a reactive object within a view of the learner via the tangible MR device 120 and/or the haptic devices 110. In embodiments, such actions may include selecting matches, dragging and dropping, writing, filling in the blank, completing a quiz, coloring, or any action capable of completing an objective of a learning activity.

In embodiments, the tangible MR program 132 may create the one or more mixed reality learning activities based on selecting one or more interactions identified within the surrounding environment that are at or within a threshold learning level of the user. In embodiments, the tangible MR program 132 may identify such interactions based on comparing the user learner model to the one or more interactions and filtering out interactions that are either too advanced or too trivial for the user. For example, the tangible MR program 132 may be configured to filter out interactions having terms outside the vocabulary level of the user, or interactions having an objective difficulty greater than or less than the subjective knowledge of the user (e.g., based on age, grade, etc.). Rather than exclude all advanced interactions, the tangible MR program 132 may alternatively be configured to include an absolute number/percentage of advanced interactions, or not to apply any filter and create a learning activity that includes all interactions within the environment. Overall, the tangible MR program 132 may be configured to compare any metrics between the learner model and identified interactions, as well as generate a learning activity that includes any number of interactions. Based on the comparisons, the tangible MR program 132 may be further configured to rank the interactions based on difficulty for the user, and may generate the learning activity based on applying the desired difficulty configuration to the rankings.

In embodiments, the tangible MR program 132 may further consider haptic information when creating one or more mixed reality learning activities. Such haptic information may be received from the haptic device(s) 110, which may be worn on muscle spindles and transmit muscle activity data to the tangible MR program 132. Such data may include any data from body-worn devices, such as activity levels, acceleration, movement speed, etc., as well as biometric data, such as heart rate, etc. Integration of haptic information allows the tangible MR program 132 to integrate preflexing with proprioception haptics, which can be used to identify a most avoided, and likely weakest, activity of a user and assign a difficulty thereto. The tangible MR program 132 may then revisit such activities in order to anneal the user towards harder learning activities in order to accelerate learning. Similar to above where the tangible MR program 132 may be configured to select interactions for generating the learning activity in various configurations, incorporation of haptic information may be similarly configured based on the desires of a user or administrator of the tangible MR device 120.

With reference to the previously introduced example, the tangible MR program 132 generates a learning activity in which the user must subsequently select the remote and television, drag fire to the wood, plug in the electric bulb, and write with a marker on the white board (illustrated by Table 2). In addition, the tangible MR program 132 incorporates haptic information to determine a difficulty level of each of the interactions, as shown.

TABLE 2

Interaction and Difficulty Mapping

| Object Node | Reactive Node | AR Animation | Difficulty |
|---|---|---|---|
| TV | Remote | TV Playing Content | 0.1 |
| Wood | Fire | Wood Burning | 0.5 |
| Electric Bulb | Electrical Connection | Bulb Glows | 0.2 |
| White Board | Marker | Writing Test | 0.9 |

The tangible MR program 132 may deploy the learning activity (step 210). In embodiments, the tangible MR program 132 may deploy the learning activity based on a user physically coming within a threshold distance of the one or more identified real objects within the environment. The tangible MR program 132 may determine a proximity of the user to the one or mor real objects using global positioning systems (GPS), trilateration, triangulation, near-field communication, RFID, etc. In addition, the tangible MR program 132 may deploy the learning activity based upon detecting a user viewing or focusing on one of the one or more identified real objects through the tangible MR device 120, for example via front-facing camera feedback, spatial analysis, the sensors 110 (e.g., gyroscope, accelerometer, etc.), and the like. Upon detecting a user within a threshold distance of a real object, the tangible MR program 132 may initialize the overlays corresponding to the created learning activity. In addition, the tangible MR program 132 may engage the haptic device(s) 110 in order to simulate the user manipulating the overlaid object and/or reactive object. For example, and responsive to the user engaging the learning activity, the haptic device(s) 110 may apply the sensation of weight/vibration, the feel hot/cold, the noise of a sound, etc. The tangible MR program 132 may further emphasize the overlays and/or interactions with visuals such as moving, shaking, maximizing/minimizing, pulsing, flashing, etc. Such visuals may additionally be used as hints to a user, e.g., should the user take a longer than expected time to complete a learning activity.

Referring again to the previously introduced example, the tangible MR program 132 deploys the learning activity to the tangible MR device 120 and overlays images of the objects and reactive objects of Table 2 upon detecting the user within a preconfigured threshold of the real objects within the surrounding environment.

The tangible MR program 132 may determine whether the learner completes the learning activity (decision 212). In embodiments, the tangible MR program 132 may determine whether the learner completes the one or more learning activities based on detecting the user complete the action required by the learning activity, e.g., drag and drop, select, etc. The tangible MR program 132 may do so via integration with the tangible MR device 120.

With reference again to the previously introduced example, the tangible MR program 132 determines whether the user subsequently selects the remote and television, drags and drops the fire on the wood, plugs in the electric bulb, and draws on the white board with the marker.

If the tangible MR program 132 determines that the learner completes the learning activity (decision 212, "YES" branch), then the tangible MR program 132 displays the corresponding animated MR reaction and removes the corresponding interaction from the view of the tangible MR device 120 (step 214). The tangible MR program 132 may then deploy a next interaction corresponding to the same real object or continue to deploy learning activities as the user comes within the threshold distance of other detected real objects. Moreover, as learning activities are completed, the tangible MR device 120 may be configured to replace the learning activities based on the interactions ranked above. In order to prevent overwhelming a user, the tangible MR device 120 may be configured to limit an amount of initialized learning activities at one time.

In the example introduced above, the tangible MR device 120 displays the reactions of the television playing content, the wood burning, the electric bulb glowing, and a writing test on the white board when the user correctly completes the learning activity. The tangible MR device 120 may additionally apply the sensation of sound/video to the television playing content, heat and sound corresponding to the wood burning, and sound of a marker writing on a white board.

If the tangible MR program 132 determines that the learner fails to complete the learning activity, the tangible MR program 132 may provide the user a hint by emphasizing the manner in which the user may complete the learning activity. For example, the tangible MR program 132 may emphasize the appropriate overlay through flashing, sizing changes, color changes, arrows, boxes, etc. In some embodiments, the tangible MR program 132 may remove the interaction if the user fails to solve the learning activity within a preconfigured time to focus on other learning activities.

With respect to the example introduced above, if the user fails to complete a learning activity, the tangible MR program 132 may emphasize an appropriate interaction and remove the learning activity from view if not completed in a preconfigured amount of time.

The tangible MR program 132 may adjust models (step 216). In embodiments, the tangible MR program 132 may adjust the learner model based on a progress of the user (complete/incomplete learning activities), user input/feedback, and an ease at which the user completes the learning activity, e.g., based on time, attempts, hints used, etc. For example, and based on a user completing interactions of a learning activity, the tangible MR program 132 may adjust the models by any one or more of marking the interactions as complete, scoring the user, removing the completed interactions from future learning activities, including a next level of the completed interactions in a following learning activity, increasing a subjective proficiency of the user with respect to the completed interactions, and decreasing an objective difficulty associated with the completed interactions. Having marked an interaction as completed, the tangible MR program 132 may then be configured to skip such interactions in future learning activities, and may further advance to a next progression of the interaction. For example, completing the interaction of drawing on a white board may lead to coloring in the drawing in a future learning session. Thus, lessons may be carried over and continued from one learning session to the next. Alternatively, and based on a user failing to complete the interactions of a learning activity, the tangible MR program 132 may adjust models by any one or more of marking the interactions as incomplete, scoring the user, repeating the incomplete interactions in future learning activities, decreasing a subjective proficiency of the user with respect to the incomplete interactions, and increasing an objective difficulty associated with the completed interactions.

The tangible MR program 132 may further incorporate received haptic data when adjusting models, resulting in a refined difficulty based on the received data. Similar to above, the tangible MR program 132 may be configured to incorporate the refined difficulties into the creation of the learning activity as desired by a user or administrator.

Concluding the aforementioned example depicted by FIG. 3, the tangible MR program 132 adjusts the learner model based on a performance of the user, and refines a difficulty associated with the completed interactions based on received haptic feedback as illustrated by Table 3:

TABLE 3

Interaction, Difficulty, and Refined Difficulty Mapping

| Object Node | Reactive Node | AR Animation | Difficulty | Refined Difficulty |
|---|---|---|---|---|
| TV | Remote | TV Playing Content | 0.1 | 0.2 |
| Wood | Fire | Wood Burning | 0.5 | 0.2 |
| Electric Bulb | Electrical Connection | Bulb Glows | 0.2 | 0.4 |
| White Board | Marker | Writing Test | 0.9 | 0 |

FIG. 3 depicts an example illustrating the operations of the tangible MR program 132 of the tangible MR system 100, in accordance with the exemplary embodiments.

Figure 4:
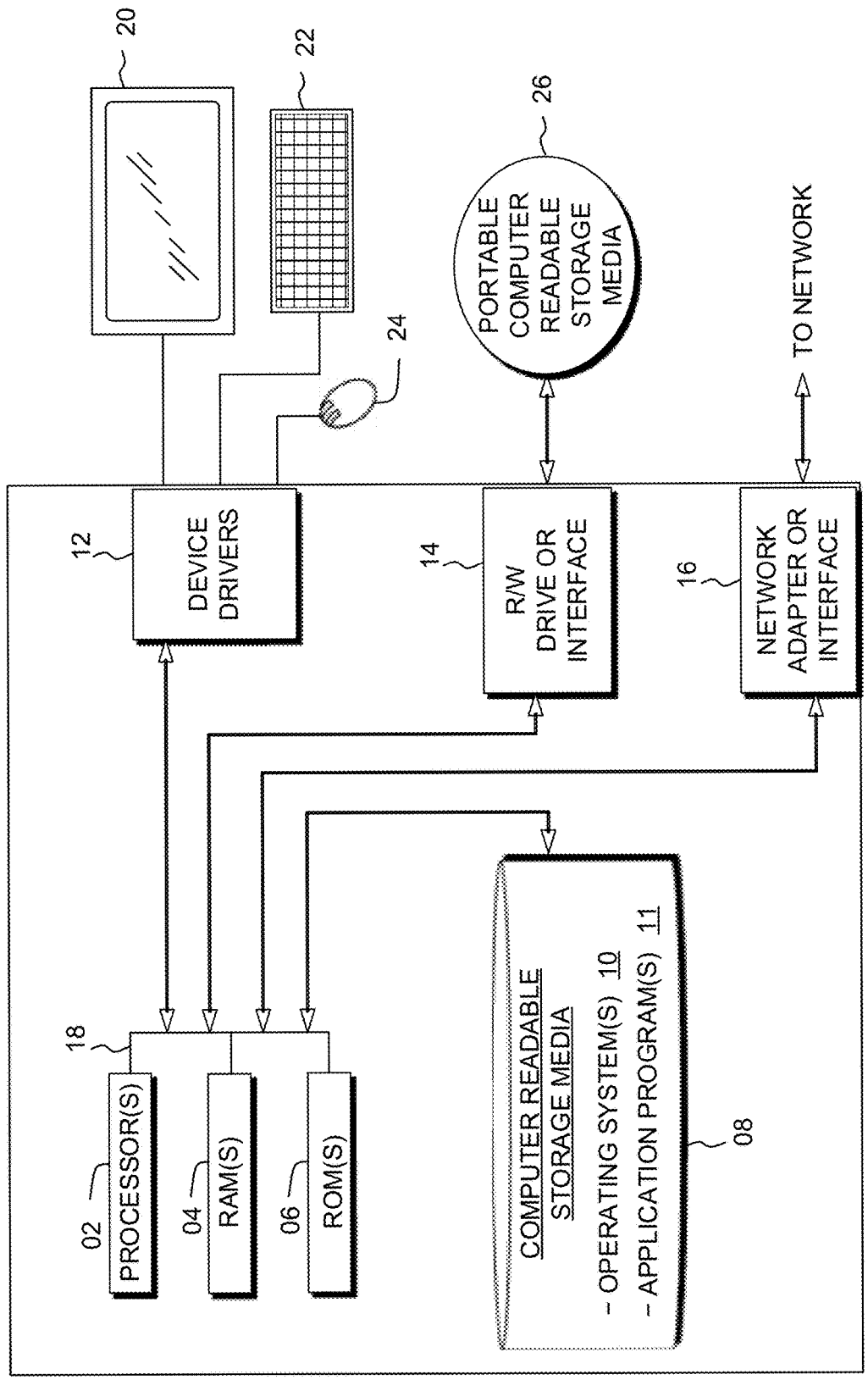
FIG. 4 depicts an exemplary block diagram depicting the hardware components of the tangible mixed reality system 100 of FIG. 1, in accordance with the exemplary embodiments.

FIG. 4 depicts a block diagram of devices used within the tangible MR system 100 of FIG. 1, in accordance with the exemplary embodiments. It should be appreciated that FIG. 4 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a RAY drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
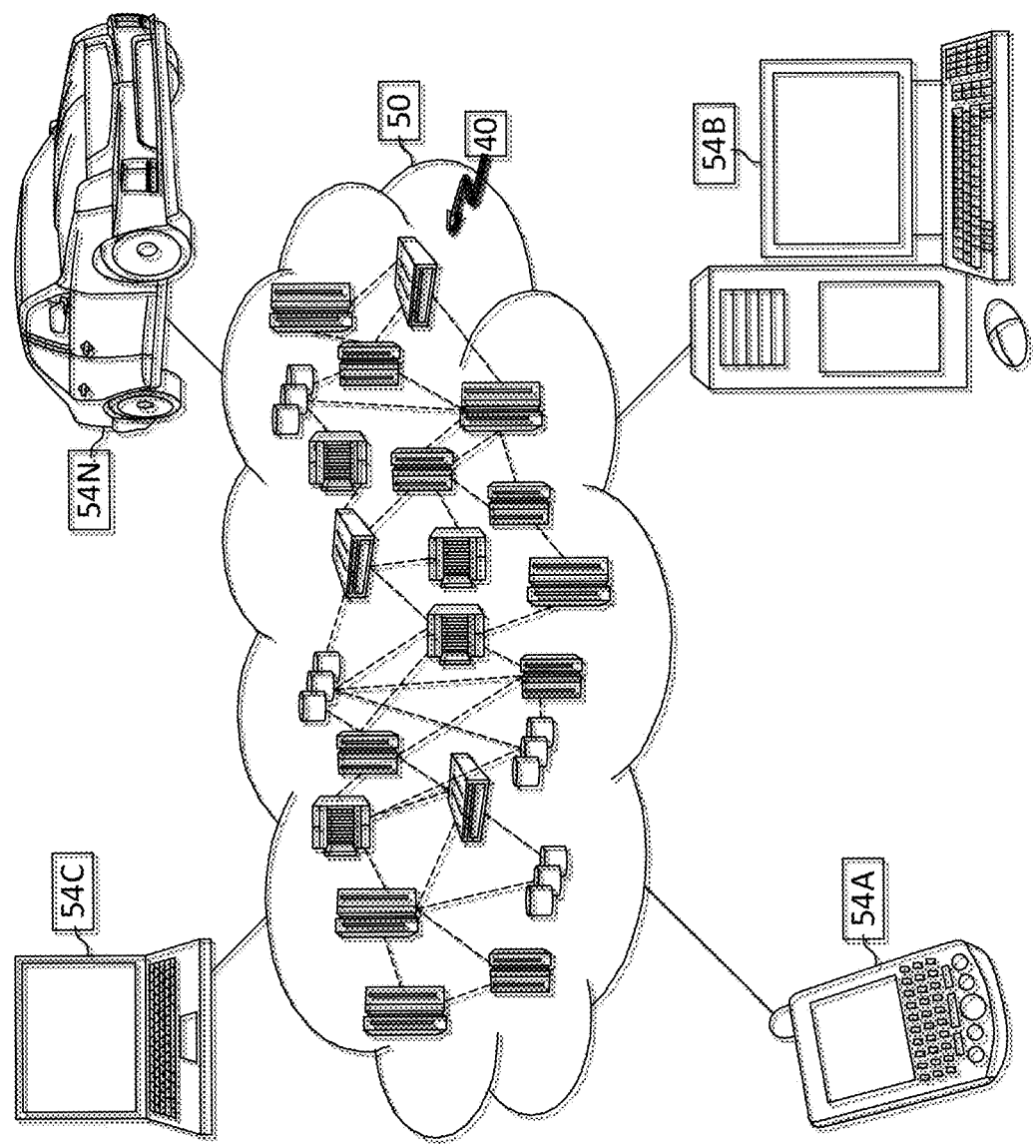
FIG. 5 depicts a cloud computing environment, in accordance with the exemplary embodiments.

Referring now to FIG. 5, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 40 and cloud computing environment 50 can communicate with any type of computerized device over any type of network and/or network addressable connection (e.g., using a web browser).

Figure 6:
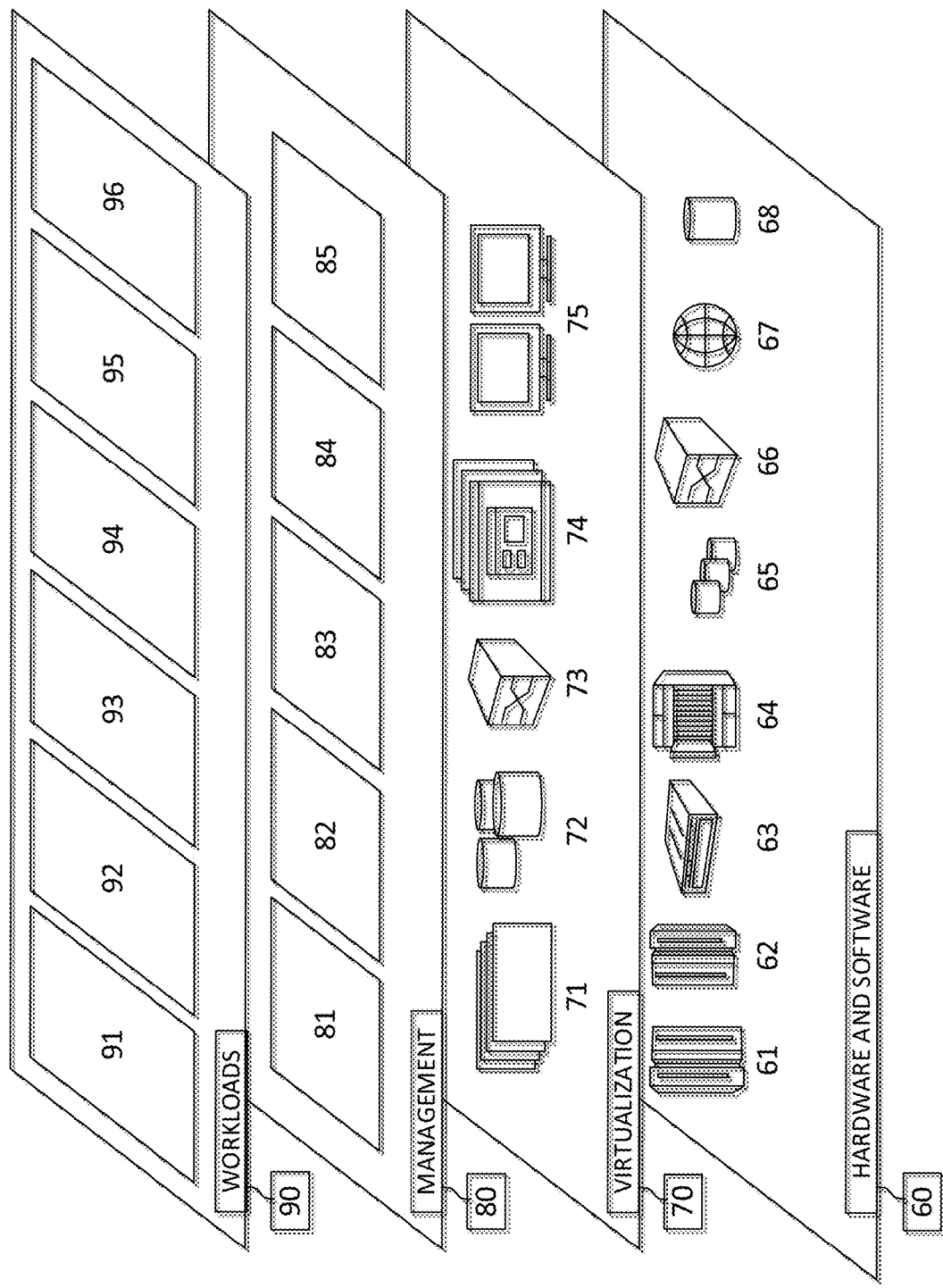
FIG. 6 depicts abstraction model layers, in accordance with the exemplary embodiments.

Referring now to FIG. 6, a set of functional abstraction layers provided by cloud computing environment 50 (FIG. 5) is shown. It should be understood in advance that the components, layers, and functions shown in FIG. 6 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfilment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and tangible mixed reality processing 96.

The exemplary embodiments may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for tangible mixed reality, the method comprising:
   identifying one or more real objects within an environment;
   identifying one or more interactions between the one or more real objects, one or more reactive objects, and one or more animations;
   generating one or more learning activities for a user of a mixed reality headset that include at least one of the one or more interactions;
   deploying the one or more learning activities to the mixed reality headset based on the user entering within a threshold proximity of the one or more real world objects;
   receiving input from the user that completes the one or more learning activities; and
   deploying the one or more animations corresponding to the one or more completed learning activities.

2. The method of claim 1, further comprising:
   providing physical feedback to one or more devices worn by the user corresponding to the one or more animations.

3. The method of claim 1, wherein generating the one or more learning activities further comprises:
   filtering at least one interaction of the one or more interactions based on the at least one interaction exceeding or failing to reach a learning level of the user.

4. The method of claim 1, further comprising:
   receiving user data from one or more devices worn by the user; and
   wherein generating the one or more learning activities is based on the user data.

5. The method of claim 1, further comprising:
   receiving input from the user that fails to complete the one or more learning activities; and
   deploying one or more hints to aid the user in completing the one or more learning activities via the mixed reality headset.

6. The method of claim 1, wherein the identifying the one or more interactions between the one or more real objects, the one or more reactive objects, and the one or more animations is based on generating a knowledge graph.

7. A computer program product for tangible mixed reality, the computer program product comprising:
   one or more non-transitory computer-readable storage media and program instructions stored on the one or more non-transitory computer-readable storage media capable of performing a method, the method comprising:
   identifying one or more real objects within an environment;
   identifying one or more interactions between the one or more real objects, one or more reactive objects, and one or more animations;
   generating one or more learning activities for a user of a mixed reality headset that include at least one of the one or more interactions;
   deploying the one or more learning activities to the mixed reality headset based on the user entering within a threshold proximity of the one or more real world objects;
   receiving input from the user that completes the one or more learning activities; and
   deploying the one or more animations corresponding to the one or more completed learning activities.

8. The computer program product of claim 7, further comprising:
   providing physical feedback to one or more devices worn by the user corresponding to the one or more animations.

9. The computer program product of claim 7, wherein generating the one or more learning activities further comprises:
   filtering at least one interaction of the one or more interactions based on the at least one interaction exceeding or failing to reach a learning level of the user.

10. The computer program product of claim 7, further comprising:
    receiving user data from one or more devices worn by the user; and
    wherein generating the one or more learning activities is based on the user data.

11. The computer program product of claim 7, further comprising:
    receiving input from the user that fails to complete the one or more learning activities; and
    deploying one or more hints to aid the user in completing the one or more learning activities via the mixed reality headset.

12. The computer program product of claim 7, wherein the identifying the one or more interactions between the one or more real objects, the one or more reactive objects, and the one or more animations is based on generating a knowledge graph.

13. A computer system for tangible mixed reality, the system comprising:

one or more computer processors, one or more computer-readable storage media, and program instructions stored on the one or more of the computer-readable storage media for execution by at least one of the one or more processors capable of performing a method, the method comprising:

identifying one or more real objects within an environment;

identifying one or more interactions between the one or more real objects, one or more reactive objects, and one or more animations;

generating one or more learning activities for a user of a mixed reality headset that include at least one of the one or more interactions;

deploying the one or more learning activities to the mixed reality headset based on the user entering within a threshold proximity of the one or more real world objects;

receiving input from the user that completes the one or more learning activities; and deploying the one or more animations corresponding to the one or more completed learning activities.

14. The computer system of claim 13, further comprising:
providing physical feedback to one or more devices worn by the user corresponding to the one or more animations.

15. The computer system of claim 13, wherein generating the one or more learning activities further comprises:
filtering at least one interaction of the one or more interactions based on the at least one interaction exceeding or failing to reach a learning level of the user.

16. The computer system of claim 13, further comprising:
receiving user data from one or more devices worn by the user; and
wherein generating the one or more learning activities is based on the user data.

17. The computer system of claim 13, further comprising:
receiving input from the user that fails to complete the one or more learning activities; and
deploying one or more hints to aid the user in completing the one or more learning activities via the mixed reality headset.

* * * * *